May 18, 1937.  R. O. WATKINS  2,080,955
PROPELLER GOVERNOR
Filed Oct. 22, 1936  2 Sheets-Sheet 1
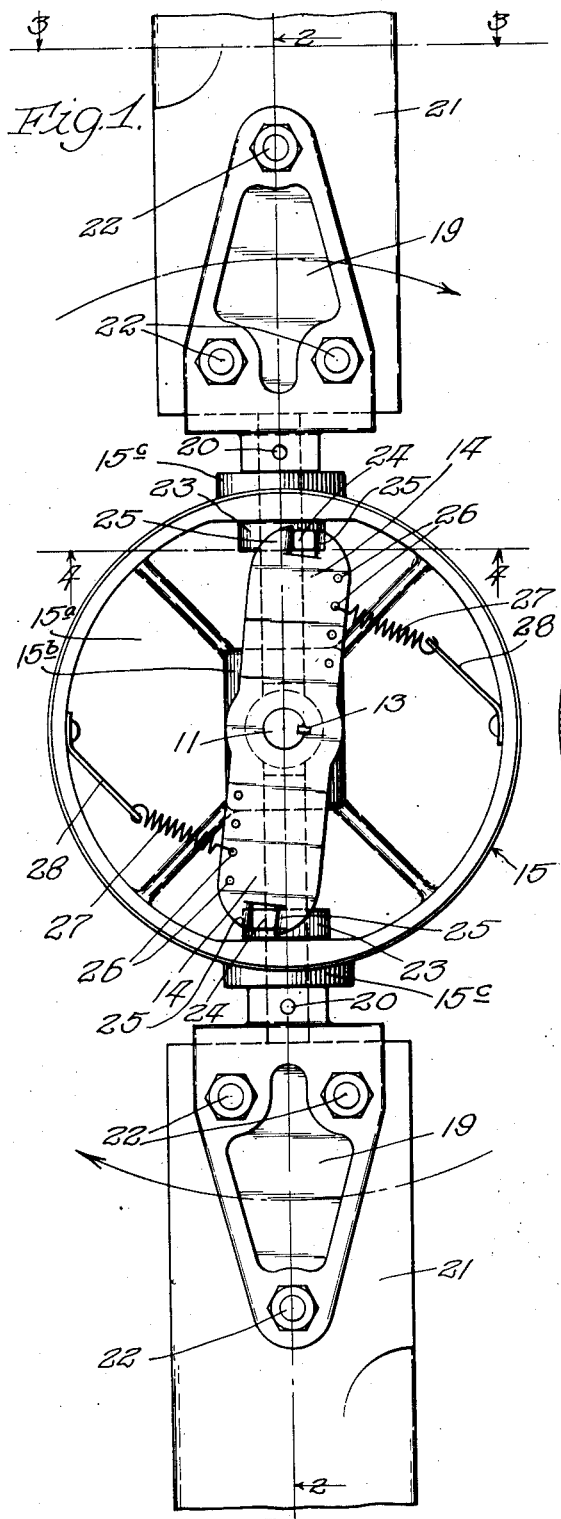
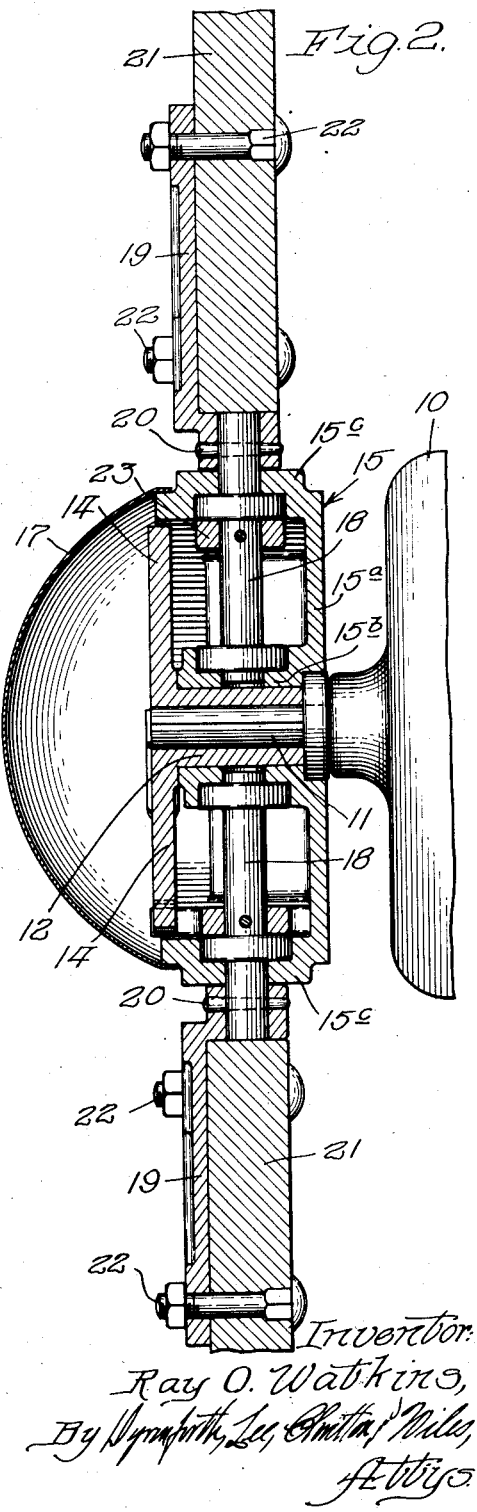
Inventor:
Ray O. Watkins,

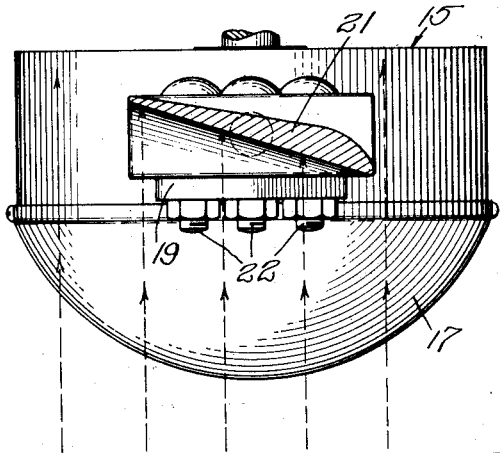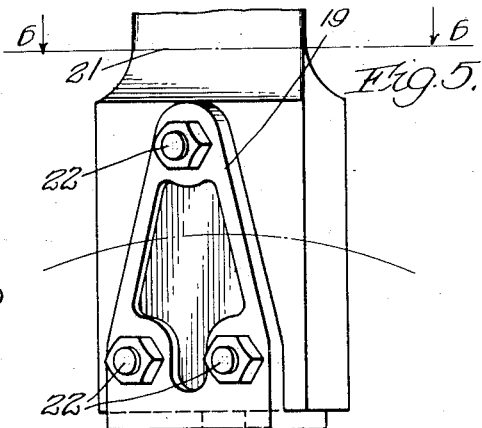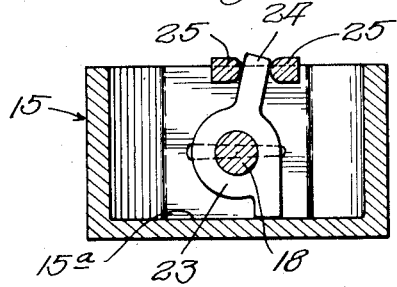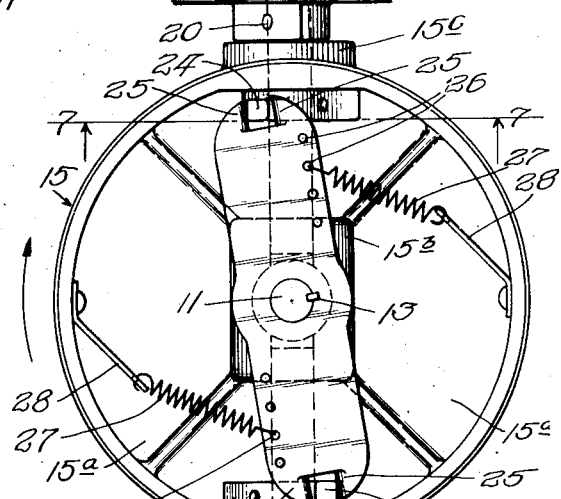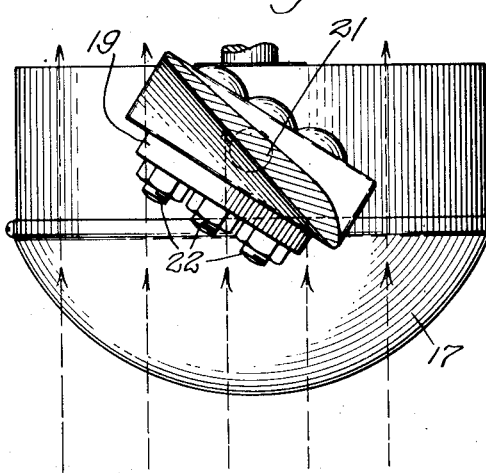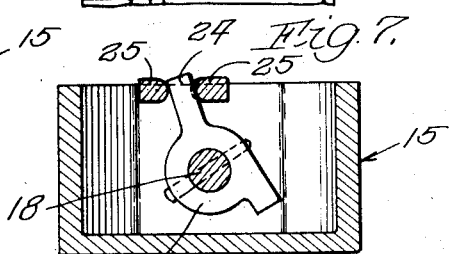

Patented May 18, 1937

2,080,955

UNITED STATES PATENT OFFICE 2,080,955

PROPELLER GOVERNOR

Ray O. Watkins, Chicago, Ill., assignor to Universal Battery Company, Chicago, Ill., a corporation of Illinois Application October 22, 1936, Serial No. 107,088

6 Claims. (Cl. 290—44)

This invention relates to improvements in propellers and more especially a wind driven propeller or wind mill. It is particularly applicable to such devices of the high speed type now commonly employed for generating electricity. Such propellers ordinarily have relatively few blades, for example, two or three, and are commonly direct connected to the electric generator. For the purpose of illustrating my invention I have here shown the same embodied in a two-blade propeller.

One of the features of my invention is the provision of means for controlling the speed of the propeller to prevent excess speeds in cyclones and other high winds which might cause damage to some of the apparatus or parts. Wind power plants usually consist of a wind driven propeller mounted on a horizontal axis, the support therefor being adapted to rotate about a vertical axis and provided with a tail vane for keeping the propeller facing the wind. Various forms of governing devices for such propellers have heretofore been in use to reduce the racing or excess speed of the propeller in strong winds. One form of the older devices employs a centrifugal governor adapted to brake the speed of the propeller at certain speeds. The difficulty with such a governor is that it always operates at substantially the same speed whereas the output of an electric generator may vary with the temperature of the generator. Since it is desirable to produce a predetermined maximum output rather constantly it will be seen that there will be inefficiency if the governor controls merely the speed of the propeller.

I have overcome the disadvantages of the older form of governor above mentioned by providing a governor that controls the speed of the propeller in accordance with the watt output of the generator. With such a device it is possible to control such watt output and hold the same substantially constant, regardless of the temperature of the generator or speed of the propeller. A cold generator will frequently produce considerably more current at a given speed than when it is hot. Since my governor controls the speed of the propeller in accordance with watt output of the generator it will be seen that when the latter is hot a somewhat greater speed of the propeller will be permitted than when it is cold.

Other features and advantages of my invention will appear more fully as I proceed with my specification.

In that form of device embodying the features of my invention shown in the accompanying drawings, Fig. 1 is a view in front elevation with the cover of the hub case removed; Fig. 2 is a vertical sectional view taken as indicated by the line 2—2 of Fig. 1; Fig. 3 is a view taken as indicated by the line 3—3 of Fig. 1; Fig. 4 is a view as indicated by the line 4—4 of Fig. 1; Fig. 5 is a view similar to Fig. 1 showing the parts in an alternate position; Fig. 6 is a view taken as indicated by the line 6—6 of Fig. 5; and Fig. 7 is a view taken as indicated by the line 7—7 of Fig. 5.

As shown in the drawings, 10 indicates an electric generator which may be of any well known form as now commonly employed in connection with high speed wind driven propellers, and 11 indicates the armature shaft thereof.

12 indicates a sleeve keyed onto the end of the shaft 11 by means of the key 13. The forward end of the sleeve 12 is provided with a cross member to provide the radially extending, diametrically opposed arms 14—14.

Rotatably mounted on the sleeve 12 is a cylindrical hub casing indicated in general by 15. This includes a circular disk 15a with inner and outer forwardly extending concentric flanges 15b and 15c respectively. The flange 15b is in the form of a sleeve rotatably mounted on the sleeve 12. 17 indicates a removable cover for the front side of the casing 15 carried by the forward edge of the flange 15c.

Rotatably and radially mounted in the casing 15 at diametrically opposite points are stub shafts 18, 18, the inner ends of which find bearings in the sleeve 15b, and the outer portions of which have bearings in the flange 15c. The outer ends of the stub shafts 18, 18 carry triangularly shaped blade holders 19 which are pinned to the shafts by the pins 20. 21, 21 indicate the wooden blades of the propeller fastened to the blade holders by means of the bolts 22, 22. By this construction the blades of the propeller are pivoted substantially on their axis in the casing 15.

The direction of rotation of the propeller is indicated by the arrows in Fig. 1, and the direction of the wind is indicated by the arrows in Figs. 3 and 6. Pinned onto the shafts 18, 18 are collars 23 provided with lugs 24, embraced by fingers 25 on the ends of the arms 14, 14. 26, 26 indicate series of holes (here shown as four in each arm) in the arms 14, and 27, 27 indicate spiral springs connecting said holes with the members 28 carried by the casing 15.

In the operation of the device the casing 15 drives the shaft 11 through the arms 14, 14. The springs furnish a yielding connection between such casing and such arms. As the load of the generator increases the springs will stretch somewhat, permitting the arms 14, 14 to drag backwardly to some extent, as shown for example in Fig. 5. The fingers 25 operating on the lugs 24 will rotate the blade holders to pivot the blades 21, that is, to bring their faces more parallel or more at right angles to the direction of the wind. This will retard the speed of the propeller. The effect of the springs can be varied by connecting them to different holes 26, 26. With the springs and the proper setting thereof, the propeller blades will remain in their original position until the generator torque or load equals that of the springs. When this is equalized and the load of the generator tends to be increased by an increased propeller speed, the springs will stretch and in so doing cause the arms 14, 14 to move backwardly somewhat in relation to the position of the casing 15. This, operating on the fingers 24, 24 will feather the propellers to prevent an undesired increase in speed. The torque of a generator may be measured in terms of watts. With my improved device it is possible for the same control to work on any voltage generator, limiting the output to the watt output of the generator. It will be seen therefore that my improved control may be used to govern the watt output of a generator regardless of its temperature or speed.

Although I have shown the invention as embodied in a two-blade propeller, it is obvious that propellers of three or more blades could be governed in a similar manner.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A device of the character described, including: a generator; an armature shaft for the generator; a wind driven propeller mounted on the armature shaft; pivoted blades on the propeller; a yielding connection between the propeller and shaft; and means of such a character that increased load in the generator will operate through said yielding connection to pivot the blades of the propeller to retard the speed thereof.

2. A device of the character described, including: a generator; an armature shaft for the generator; a wind driven propeller mounted on the armature shaft; pivoted blades on the propeller; a connection between the propeller and shaft of such a character that load on the shaft tends to pivot the blades of the propeller; and yielding means for resisting said pivoting tendency.

3. A device of the character described, including: a driven shaft; a wind driven propeller on said shaft; pivoted blades on said propeller; a yielding connection between the propeller and shaft; and means of such a character that increased load on the shaft will operate through said yielding connection to pivot the blades of the propeller to retard the speed thereof.

4. A device of the character described, including: a driven shaft; a wind driven propeller mounted on the shaft; pivoted blades on the propeller; a connection between the propeller and shaft of such a character that load on the shaft tends to pivot the blades of the propeller; and yielding means for resisting said pivoting tendency.

5. A device of the character described, including: a driven shaft; a wind driven propeller on said shaft; pivoted supports for the blades of the propeller; a connection between said blades and the shaft of such a character that load on the shaft tends to pivot the blades, said connection including fingers on the pivoted supports for the blades, said fingers engaging members carried by the shaft; and yielding means for resisting said pivoting tendency.

6. A device of the character described, including: a driven shaft; a wind driven propeller on said shaft; a pivoted blade on the propeller; a connection between the propeller and shaft of such a character that load on the shaft tends to pivot said blade of said propeller; and yielding means for resisting said pivoting tendency.

RAY O. WATKINS.